(12) United States Patent
Shlomai et al.

(10) Patent No.: US 10,853,047 B2
(45) Date of Patent: *Dec. 1, 2020

(54) METHOD FOR VIRTUALIZING SOFTWARE APPLICATIONS

(71) Applicant: BlackBerry Limited, Waterloo (CA)

(72) Inventors: Netzer Shlomai, Ra'anana (IL); Yoram Gabay, Stamford, CT (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,931

(22) Filed: Feb. 22, 2019

(65) Prior Publication Data
US 2019/0187969 A1    Jun. 20, 2019

Related U.S. Application Data

(63) Continuation of application No. 12/419,030, filed on Apr. 6, 2009, now Pat. No. 10,248,398.
(Continued)

(51) Int. Cl.
| | |
|---|---|
| *G06F 8/61* | (2018.01) |
| *G06F 9/44* | (2018.01) |
| *G06F 9/455* | (2018.01) |
| *G06Q 10/10* | (2012.01) |
| *H04L 29/06* | (2006.01) |
| *G06F 8/60* | (2018.01) |
| *G06F 21/12* | (2013.01) |

(52) U.S. Cl.
CPC .......... *G06F 8/61* (2013.01); *G06F 9/44* (2013.01); *G06F 9/455* (2013.01); *G06Q 10/10* (2013.01); *H04L 67/40* (2013.01); *G06F 8/60* (2013.01); *G06F 21/121* (2013.01)

(58) Field of Classification Search
CPC ..... G06F 8/60; G06F 8/61; G06F 8/63; G06F 9/44; G06F 9/4451; G06F 9/455; G06F 17/30067; G06F 21/121; G06Q 10/10; H04L 67/40
See application file for complete search history.

(56) References Cited

U.S. PATENT DOCUMENTS

| | | | |
|---|---|---|---|
| 6,854,061 B2 * | 2/2005 | Cooper et al. | ........ G06F 21/121 713/190 |
| 2002/0124245 A1 * | 9/2002 | Maddux et al. | .......... G06F 8/60 717/176 |

(Continued)

OTHER PUBLICATIONS

Huda, Advisory Action for U.S. Appl. No. 12/419,030, dated Nov. 25, 2016.
(Continued)

*Primary Examiner* — Wei Y Zhen
*Assistant Examiner* — Mohammed N Huda
(74) *Attorney, Agent, or Firm* — Integral Intellectual Property Inc.; Miriam Paton; Amy Scouten

(57) ABSTRACT

A method for virtualizing of software applications. The method comprises initializing a virtual environment created by a virtual engine executed over a computer; creating a new data file; launching an installation process of a software application to be virtualized, wherein the installation process runs in the virtual environment; during the installation process, capturing data writes to a file system of the computer's operating system; and saving the data writes to the new data file.

20 Claims, 3 Drawing Sheets

Related U.S. Application Data

(60) Provisional application No. 61/123,370, filed on Apr. 7, 2008.

(56) References Cited

U.S. PATENT DOCUMENTS

| | | | | |
|---|---|---|---|---|
| 2007/0113069 A1* | 5/2007 | Gentil et al. | ......... | G06F 9/4451 |
| | | | | 713/100 |
| 2009/0144725 A1* | 6/2009 | Vrhel, Jr. | ................. | G06F 8/60 |
| | | | | 717/174 |
| 2009/0198731 A1* | 8/2009 | Noonan, III | ............ | G06F 16/10 |
| 2009/0276771 A1* | 11/2009 | Nickolov et al. | ..... | G06F 9/4856 |
| | | | | 717/177 |

OTHER PUBLICATIONS

Huda, Fifth Office Action for U.S. Appl. No. 12/419,030, dated Jul. 15, 2016.
Huda, Fourth Office Action for U.S. Appl. No. 12/419,030, dated Jan. 5, 2016.
Huda, Notice of Allowance for U.S. Appl. No. 12/419,030, dated Nov. 16, 2018.
Huda, First Office Action for U.S. Appl. No. 12/419,030, dated Feb. 2, 2012.
Huda, Second Office Action for U.S. Appl. No. 12/419,030, dated Jul. 19, 2013.
Huda, Third Office Action for U.S. Appl. No. 12/419,030, dated May 22, 2014.
Huda, Examiners Answer to Appeal Brief for U.S. Appl. No. 12/419,030, dated Jul. 2, 2015.

\* cited by examiner

US 10,853,047 B2

METHOD FOR VIRTUALIZING SOFTWARE APPLICATIONS

CROSS-REFERENCE TO RELATED APPLICATIONS

This application is a continuation of U.S. patent application Ser. No. 12/419,030 filed Apr. 6, 2009, which claims the benefit of U.S. Provisional Patent Application No. 61/123,370 filed Apr. 7, 2008, both of which are incorporated herein by reference.

FIELD OF THE INVENTION

The present invention relates generally to virtual software applications, and more particularly to a method for generating virtual software application files.

BACKGROUND OF THE INVENTION

Personal computers (PCs) serve a multitude of software applications, features and functions. The applications provide the user with tools to accomplish tasks, such as, but not limited to, document processing, spreadsheet management, email exchanges and Internet browsing. The features and functions are commonly referred to as "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality to the operating system, as well as ensuring that the application can be removed. Still, even though an installation process is mostly carried-out by automatic installation programs, installation, removal and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Typically modern operating systems, such as Microsoft® XP® or Microsoft Vista® include a registry file for storing operating system user and application settings and options, dynamic link libraries (DLLs) which contains shared code, and named objects for naming functions shared by different processes. This structure of an operating system causes most of the challenges associated with application installation, most notable of which are:

1. Operating system Stability and Performance: Installations permanently modify the operating system (even after uninstalling) resulting in an incremental decline in operating system performance due to uninstalled leftovers (orphan files), inflated registry files, and so on.

2. Conflicts: Installations cause application conflicts due to various incompatibilities and resource sharing issues.

3. Rigidness: Applications are installed into the operating system in a way that prevents the applications from being "detached" and migrated between different computers; applications are executed exclusively within the environment in which they were initially installed.

4. Security: When applications and the operating system are fused together, internal cross contamination is almost inevitable.

These problems have resulted in information technology (IT) departments expending substantial wasted time, money and manpower on application lifecycle tasks, regression/compatibility tests, deployment and management, help desk and support issues, and more.

Virtualization technology allows delivering configured virtual applications to PCs and to run such applications inside an isolated virtual environment having its own virtual file system and virtual registry. That is, a running virtual application will not conflict or impact other virtual applications that may coexist in the virtual environment. However, a virtual application may conflict or impact installed (non-virtual) applications or the operating system of a PC.

Traditionally, to generate virtual application files (or packages), system administrators execute a wizard that monitors and records interactions between a non-virtual application and an operating system during the application installation and execution. The wizard typically analyzes which operating system components the application uses or depends upon. Using this information, a virtual application package for an application is created. Thereafter, the created application is tested to determine if there are any conflicts with any operating system and any applications that are physically installed. An example for such a wizard is the Microsoft Application Virtualization Sequencer.

In order to ensure proper execution of virtual applications, the wizard must be executed on a "clean machine," i.e., a computer or server that does not include any software components required for the execution of the generated virtual application. For example, if a virtual application is created on a machine that includes a DLL file that the application uses during its execution, the generated virtual application package will not include this DLL file. Thus, the generated virtual application cannot be executed on a different machine on which the DLL file is not installed. Furthermore, a virtual application generated for example using the wizard discussed above, can be executed only on machines having the same operating system version as the machine on which the virtual application was created. For example, if the virtual application is created on a machine running Microsoft XP® then this application cannot be executed on a machine with Microsoft Vista®.

Therefore, it would be advantageous to provide an efficient solution for generating virtual applications.

SUMMARY OF THE INVENTION

Certain embodiments of the invention include a method for virtualizing software applications. The method comprises initializing a virtual environment created by a virtual engine executed over a computer; creating a new data file; launching an installation process of a software application to be virtualized, wherein the installation process runs in the virtual environment; during the installation process, capturing data writes to a file system of the computer's operating system; and saving the data writes to the new data file.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
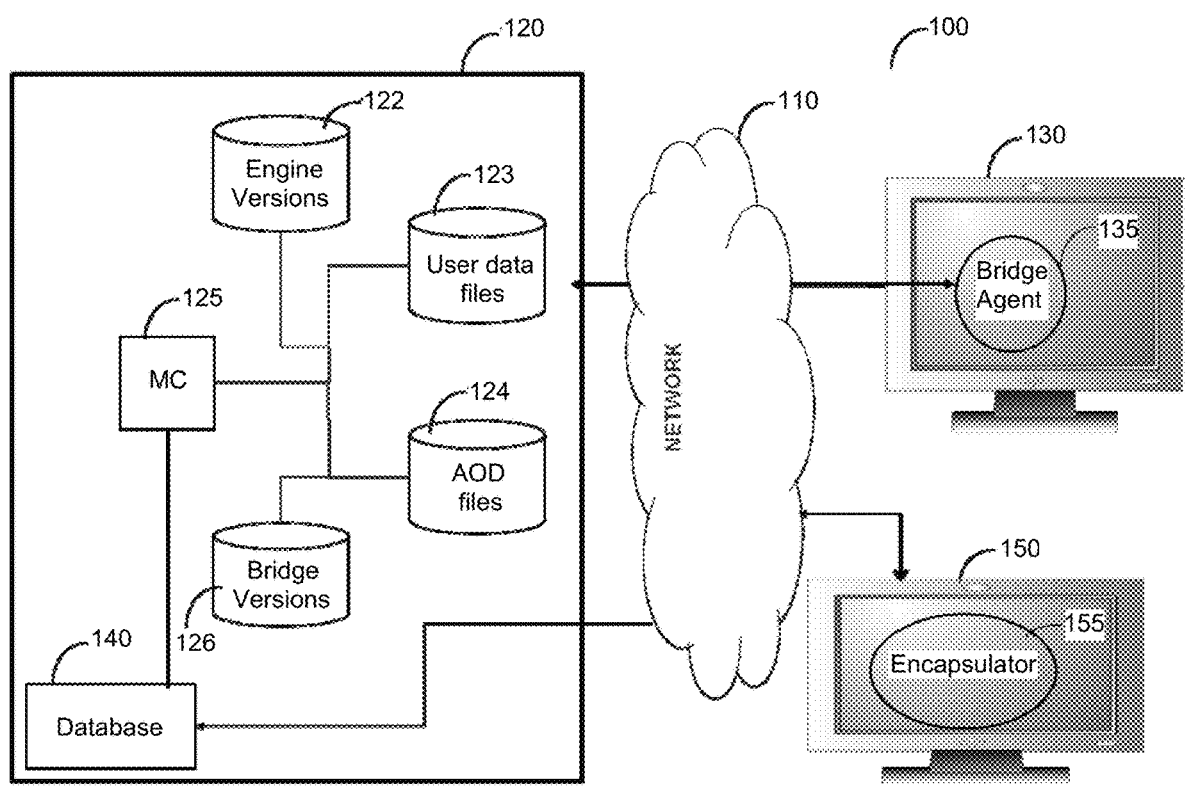
FIG. 1 is a diagram illustrating a computer network system useful in describing the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a diagram illustrating a computer network system 100 useful in describing the principles of the invention. Without limiting the scope of the invention the system 100 is a simplified structure of a computer system deployed in an organization where only a single file server 120 is connected through a network 110 to a single personal computer (PC) 130. It is appreciated that such systems typically includes one or more file servers and a plurality of PCs of users in the organization. The network 110 may be, but is not limited to, a local area network (LAN), a wide area network (WAN), the Internet, or any combination thereof.

The PC 130 may be any computing device running an operating system and include, for example, a laptop computer, a smart phone, a personal digital assistance (PDA), and the like. The PC's operating system maybe, but is not limited to, a Windows® XP®, Windows Vista®, Linux®, and the like.

In accordance with a preferred embodiment, the PC 130 runs a bridge agent 135 which is a virtual service that enables central deployment of virtual software applications on the PC 130 without altering or making changes to the PC 130. In accordance with this embodiment, the bridge agent 135 retrieves, from the file server 120, files of virtual applications assigned to a user of the PC 130 and causes the execution of these applications over the PC 130. In addition, the bridge agent 135 performs shell integration by binding the virtual applications to the operating system shell without writing or changing the registry or file system of the PC 130. The virtual applications are not installed on the PC 130, but function as if they were installed on the PC 130 and are available online and/or offline. An operating system shell provides access to the kernel services of the operating system. The PC 130 may be a locked-down computer which is a computer being operated by a user account or process that does not have full administrator permissions. The PC 130 may also run non-virtual applications with or without the control of the bridge agent 135. The file server 120 includes a management console 125 and a database 140.

In accordance with an embodiment of the invention, a virtual application consists of the following files: a virtual engine, a user data file, and an application on demand (AOD) file. The virtual engine is an executable computing environment with its own read/write file system and registry, dynamic link library (DLL) repositories, and named objects. A user data file contains all the personalization and customization data that an application would have traditionally written into system files of the operating system. The user data file can also contain add-ins that were installed by the user while working on a virtual application, modified toolbars, preferences, temporary files, registry changes, user files (e.g., documents, music, video, etc.), and so on. User data files may be encrypted.

An AOD file includes all of the resources that a virtual application needs to run within the virtual environment. In accordance with principles of the present invention, for the purpose of executing virtual applications AOD files are generated by an Encapsulator 155. In the exemplary system 100 the Encapsulator 155 is executed over a PC 150. However, the Encapsulator 155 may be executed by any computer or server in the organization. Furthermore, any computer or server on which the Encapsulator 155 is executed does not require to serve the function of a "clean machine" as described above.

Figure 2:
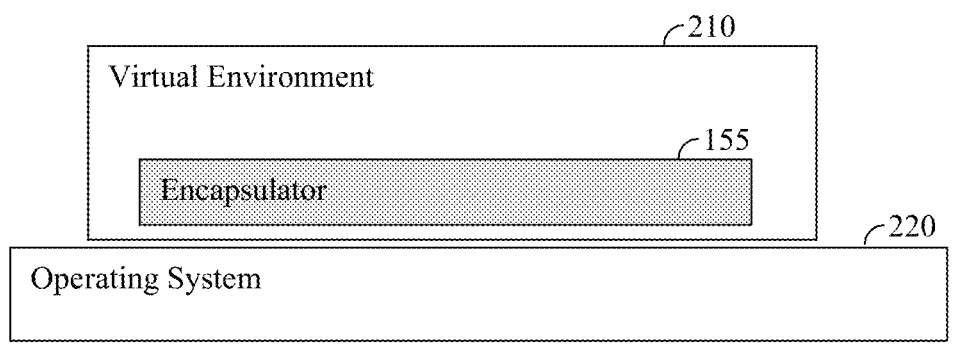
FIG. 2 is a diagram illustrating the execution environment of the Encapsulator.

As illustrated in FIG. 2, the Encapsulator 155 is executed in a virtual environment 210. Specifically, the Encapsulator 155 is a virtual application consisting of a virtual engine, an AOD file, and a user data file. The Encapsulator 155 is executed over an operating system 220, which may be any of the operating system's types mentioned above. This configuration eliminates the need for a specialized computer and/or "clean machine" and diminishing any dependencies and impurities that the underlying operating system 220 might contain. That is, the AOD files created by the Encapsulator 155 are not bound to the type of the operating system 220 or its components (e.g., DLL files). Furthermore, AOD files generated by the Encapsulator 155 do not have to be checked for compliance with the operating system or any applications that are physically installed.

In some instances an installation of an application may require certain dependencies to be present on the PC 150. A common example is the Net framework which is necessitated by many applications for their execution. When creating a virtual application using the Encapsulator 155, a list of dependencies (in the form of AOD files) may be defined. The dependencies are also virtual applications included in the Encapsulator 155 virtual environment. This feature enables the installation process to access any defined "virtual" dependency. It is important to note that dependencies required by the installation process are not part of the resulting AOD files, but are separately streamed to the PC 130.

In accordance with one embodiment of the invention an AOD file generated by the Encapsulator 155 includes an internal virtual services manager, a digital rights management layer, a connectivity layer, and a protection layer. The protection layer seals the virtual applications from the environment of the host operating system of the PC 130 and provides the virtual applications with the required function calls and returned data and further preventing any data from being written to the host operating system. The connectivity layer enables the virtual application to communicate with other virtual applications and define the integration with the operating system shell. For example, the connectivity layer includes registry keys and files that contain shell components, such as file extensions, programs files links, system tray, quick launch, and so on.

Once created the AOD files are maintained in a storage unit 124. The virtual engines are stored, per virtual application, in a storage unit 122, and the user data files are saved, per user and per application, in a storage unit 123. In other implementations user data files, AOD files, and virtual engine files may be stored locally on the user PC. All storage units 122, 123 and 124 may be part of the file server 120 which also includes a storage unit 126 for maintaining different versions of the bridge agents 135, each version may be per user or group of users.

To execute a virtual application the respective AOD file, virtual engine and user data file are streamed to the PC 130 and locally stored thereon. Virtual applications executed over the PC 130 do not write data files, registry keys, and so on to the host operating system, but instead to the user data file that contains all the data written during the time the virtual application was active. A detailed discussion on the execution of virtual applications can be found in co-pending U.S. patent application Ser. No. 11/697,700 filed Apr. 6, 2007 and U.S. application Ser. No. 11/697,702 filed Apr. 6, 2007, the contents of which are incorporated by reference herein in their entirety.

Figure 3:
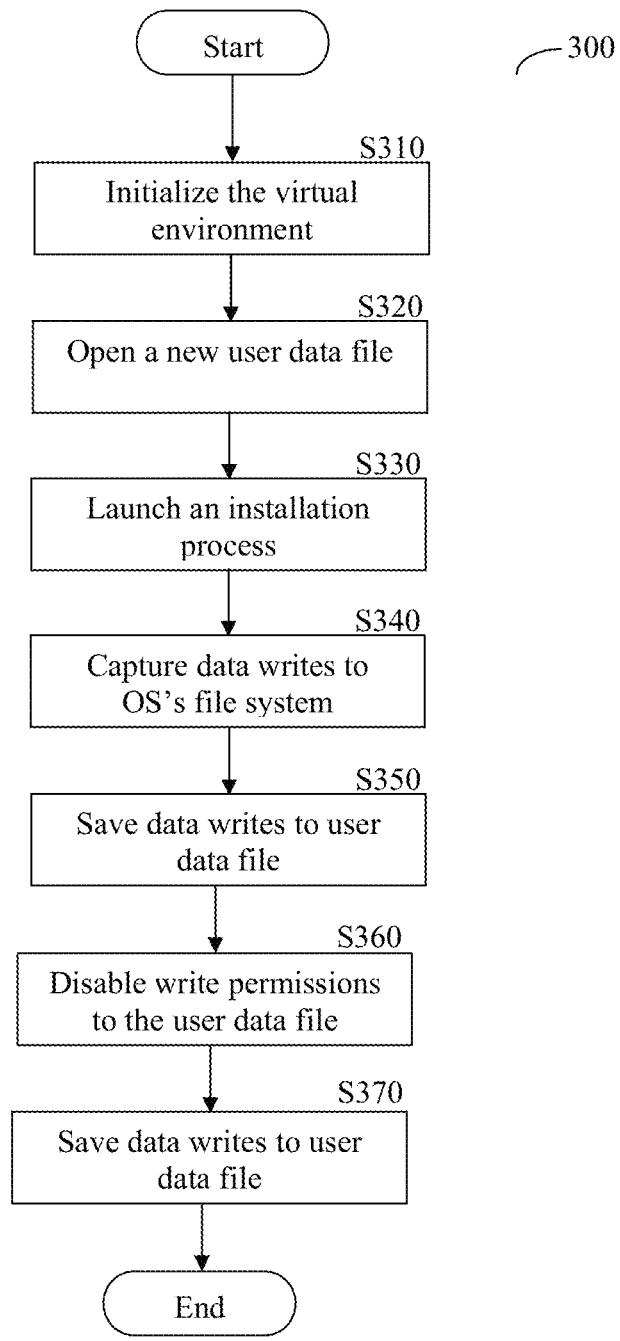
FIG. 3 is a flowchart describing the method for generating virtual application files implemented in accordance with an embodiment of the invention.

FIG. 3 shows a non-limiting and exemplary flowchart 300 describing the method for creating an AOD file implemented in accordance with an embodiment of the invention. In one embodiment the method is performed by the Encapsulator 155. As mentioned above an AOD file includes all the information required to execute a virtual application. That is, the Encapsulator 155 "virtualized" a non-virtual software application by creating an AOD file of the application. A virtual application is an application which is not installed on the PC 130 on which it being is executed.

At S310 the Encapsulator 155 is initialized by its own virtual engine to run in the virtual environment. At S320 a new and empty user data file is opened. The user data file is utilized to maintain all data writes performed during an installation of an application. In accordance with one embodiment, the user data file comprises a session file for keeping track of each usage or session of a virtual application by the user, an index file for keeping track of blocks of data, and a data file containing blocks of data pointed to by the index file and the session file. At S330 an installation process of a software application to be virtualized is executed. For example, if the application to be virtualized is Adobe Acrobat®, then an installation process of Adobe Acrobat is launched by the Encapsulator 155. It should be noted that the installation process is being executed in the virtual environment, thus no files are written to the PC (e.g., PC 150) during the application installation.

At S340 the installation process is monitored, and all data writes to the file system of the operating system performed during the installation are captured by the Encapsulator 155. At S350 the captured data writes are saved in the user data file created at S320. The data writes include, for example, DLL files, registry keys, named objects, and so on.

At S360 once the installation is completed, all write permissions to the user data file are disabled, and then at S370 the user data file is saved as an AOD file. That is, an AOD file is a read only file.

The creation of AOD files, thereby of virtual application files can be performed by system administrators which may save the files in the storage unit 124 and later deploy the applications (by stream virtual application files) to users. In accordance with another embodiment of the invention, the creation of AOD files may be automatically initiated by bridge agent 135 whenever a user of the PC 130 tries to install a non-virtual application. Such application may be downloaded from the Internet, an Intranet or uploaded from a CD. Once such attempt is detected, the bridge agent 135 calls to the Encapsulator 155 to execute the AOD creation process described in detail above. The process of enabling users to create virtual application files on their PCs may be controlled by a system administrator. When the option is granted the system administrator may enable or disable this process as well as monitor and approve/disapprove generated AOD files. It should be noted that the process of creating virtual application files by users on their PCs cannot be performed by prior art techniques that require a clean machine in order to generate such files. Obviously, PCs of users cannot be considered as clean machines.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computing device configured for virtualizing a software application, the computing device comprising:
   a processor; and
   a memory storing computer-executable code which, when executed by the processor, causes the processor
      to launch an installation process of the software application, wherein the installation process runs in a virtual environment created by a virtual engine executed over the computing device; and
      to capture data writes performed during the installation process and save the captured data writes to a data file,
   wherein the data file, upon completion of the installation process, does not store an operating system.

2. The computing device as claimed in claim 1, wherein the computer-executable code, when executed by the processor, further causes the processor:
   to disable write permissions to the data file upon completion of the installation process; and
   to save the data file as an application-on-demand (AOD) file.

3. The computing device as claimed in claim 2, wherein the AOD file includes all the information required to execute a virtual software application that corresponds to the software application.

4. The computing device as claimed in claim 2, wherein the AOD file comprises at least an internal virtual services manager, a digital rights management layer, a connectivity layer, and a protection layer.

5. The computing device as claimed in claim 1, wherein the data writes to the file system include at least one dynamic link library (DLL) file.

6. The computing device as claimed in claim 1, wherein the virtual engine is an executable computing environment.

7. The computing device as claimed in claim 1, wherein the virtual engine includes a file system, a registry repository, a dynamic link library (DLL) repository, and named objects.

8. A non-transitory computer-readable medium storing computer-executable code which, when executed by a processor of a computing device, causes the processor:
   to launch an installation process of a software application to be virtualized, wherein the installation process runs in a virtual environment created by a virtual engine executed over the computing device; and
   to capture data writes performed during the installation process and save the captured data writes to a data file,
   wherein the data file, upon completion of the installation process, does not store an operating system.

9. The non-transitory computer-readable medium as claimed in claim 8, wherein the computer-executable code, when executed by the processor, further causes the processor:
   to disable write permissions to the data file upon completion of the installation process; and
   to save the data file as an application-on-demand (AOD) file.

10. The non-transitory computer-readable medium as claimed in claim 9, wherein the AOD file includes all the information required to execute a virtual software application that corresponds to the software application.

11. The non-transitory computer-readable medium as claimed in claim 9, wherein the AOD file comprises at least an internal virtual services manager, a digital rights management layer, a connectivity layer, and a protection layer.

12. The non-transitory computer-readable medium as claimed in claim 8, wherein the data writes to the file system include at least one dynamic link library (DLL) file.

13. The non-transitory computer-readable medium as claimed in claim 8, wherein the virtual engine is an executable computing environment.

14. The non-transitory computer-readable medium as claimed in claim 8, wherein the virtual engine includes a file system, a registry repository, a dynamic link library (DLL) repository, and named objects.

15. A method performed at a computing device for virtualizing a software application, the method comprising:
   launching an installation process of the software application, wherein the installation process runs in a virtual environment created by a virtual engine executed over the computing device; and
   capturing data writes performed during the installation process and saving the captured data writes to a data file,
   wherein the data file, upon completion of the installation process, does not store an operating system.

16. The method as claimed in claim 15, further comprising:
   disabling write permissions to the data file upon completion of the installation process; and
   saving the data file as an application-on-demand (AOD) file.

17. The method as claimed in claim 16, wherein the AOD file includes all the information required to execute a virtual software application that corresponds to the software application.

18. The method as claimed in claim 16, wherein the AOD file comprises at least an internal virtual services manager, a digital rights management layer, a connectivity layer, and a protection layer.

19. The method as claimed in claim 15, wherein the data writes to the file system include at least one dynamic link library (DLL) file.

20. The method as claimed in claim 15, wherein the virtual engine is an executable computing environment.

* * * * *